(12) United States Patent
Rubino et al.

(10) Patent No.: US 6,695,134 B2
(45) Date of Patent: Feb. 24, 2004

(54) JOINT FOR TOOTHED BELT FOR CONVEYING ARTICLES

(75) Inventors: Carmen Rubino, Bologna (IT); Attilio Rubino, Anzolo Emilia (IT); Michele Barone, Pietra Montecorvino (IT); Damiano Dondarini, Bologna (IT); Marco Verri, S. Lazzaro di Savena (IT)

(73) Assignee: Vision Tech S.r.l., Bologna (IT)

( * ) Notice: Subject to any disclaimer, the term of this patent is extended or adjusted under 35 U.S.C. 154(b) by 0 days.

(21) Appl. No.: 10/356,852

(22) Filed: Feb. 3, 2003

(65) Prior Publication Data

US 2003/0146072 A1 Aug. 7, 2003

(30) Foreign Application Priority Data

Feb. 5, 2002 (IT) ..................................... BO2002A0062

(51) Int. Cl.7 ............................................... B65G 17/00
(52) U.S. Cl. ..................... 198/851; 198/844.2; 198/847; 198/853
(58) Field of Search ................................ 198/851, 847, 198/844.1, 844.2, 850, 853

(56) References Cited

U.S. PATENT DOCUMENTS

| | | | | |
|---|---|---|---|---|
| 396,532 A | * | 1/1889 | Bramwell | 198/851 |
| 2,681,728 A | * | 6/1954 | Boron | 198/851 |
| 3,546,054 A | * | 12/1970 | Ross | 198/847 |
| 4,138,011 A | * | 2/1979 | Lapeyre | 198/844 |
| 4,371,580 A | * | 2/1983 | Morrison et al. | 198/847 |
| 4,533,420 A | * | 8/1985 | Wetzel | 156/138 |
| 4,645,274 A | * | 2/1987 | Wohlford et al. | 305/47 |
| 4,893,709 A | * | 1/1990 | Schroeder et al. | 198/852 |
| 4,900,609 A | * | 2/1990 | Arnold | 428/163 |
| 5,361,893 A | * | 11/1994 | Lapeyre et al. | 198/853 |
| 5,405,477 A | * | 4/1995 | Arnold | 156/304.5 |
| 6,569,290 B2 | * | 5/2003 | Johnson | 162/348 |

\* cited by examiner

*Primary Examiner*—Douglass Hess
(74) *Attorney, Agent, or Firm*—William J. Sapone; Coleman Sudol Sapone, P.C.

(57) ABSTRACT

A joint for toothed belt aimed at conveying articles, with the belt including an inner central layer, which defines the belt body, an upper layer, which defines a surface for receiving articles to be conveyed, and a lower layer featuring teeth, includes: first connecting mechanism, attached in an irremovable way to the central layer in the area of the terminal section of a belt first edge to be joined; second connecting mechanism, attached irremovably to the central layer in the area of the terminal section of a belt second edge to be joined. After the first edge had been moved close to the second edge to complete a closed loop formed by the belt, the first connecting mechanism and second connecting mechanism engage with each other and are reciprocally locked in a removable way by locking mechanism, acting crosswise to the belt in the area of the central layer, to join the first edge and second edge.

18 Claims, 2 Drawing Sheets

JOINT FOR TOOTHED BELT FOR CONVEYING ARTICLES

BACKGROUND OF THE INVENTION

The present invention relates to transmission means, like e.g. belts, and in particular toothed belts used in automatic machines for special applications, such as synchronized transport and transferring of articles with precise positioning.

DESCRIPTION OF THE PRIOR ART

Known belts for special applications, such as conveying articles, typically include a central support layer, defining the belt body, an upper layer, defining the surface for receiving the articles to be conveyed, and a lower layer. The lower layer features teeth which meshes with the teeth of pulley provided in a line of an automatic machine.

The above mentioned central support layer can be made of e.g. a plurality of strands, parallel to each other, e.g. steel or kevlar, dipped, during molding, in a polymeric material, like e.g. polyurethane.

Otherwise, the central layer can be formed only by elastic polyurethane material.

The upper layer, called coating layer, can be formed by a special material with high friction, in order to facilitate keeping the articles to be conveyed in the correct position, or it can be formed by a fabric having low friction, or other materials suited to the required specific operation needs.

The upper layer of the belt coating layer may be provided with relative fittings, which extend vertical or inclined and are suitably shaped, regularly spaced apart to define successive seats for housing the articles to be conveyed.

The most relevant drawback deriving from the use of such belts is the difficulty encountered during installation directly on the corresponding machine, as well as during removal in case substitution is required.

Actually, in order to carry out these operations, and in particular to mount and remove, from one side, the belts on and from the relative pulleys, suitable working space is needed, which can be obtained only by disassembling protective elements or other parts of the automatic machine. These are complicated operations requiring long downtimes of the machine and specialized technicians.

In order to facilitate mounting and removal operations, there have been proposed toothed belts, which can be closed by a joint set between the two facing ends, directly on the machine.

According to a first type of these belts, the terminal section of the two ends to be joined feature appendixes, facing each other and staggered one with respect to the other.

After having moved close the two ends, the appendixes are welded together to define a joint.

Although this kind of belt can be easily assembled on the machine, the realization of the joint by welding requires an intervention of a highly specialized personnel, use of suitable instruments and performing difficult operations which result in considerable downtimes of the machine In other types of closable toothed belts, the two edges to be joined are closed by a mechanical joint.

The mechanical joint is obtained by an outer plate or strip, which is placed onto the upper coating layer of the belt in a region corresponding to the ends, to join, after the belt has been closed, and then fastened to the ends, thus joining them. Fastening means are used, which cross suitable holes passing vertically made through the belt in a region corresponding to the adjacent teeth.

A so obtained joint makes the belt more rigid in the region corresponding to the joined edges, consequently the belt is less flexible, because of a rigid body which protrudes from the flat surface of the belt.

Moreover, the presence of the plate or strip occupying a portion of the outer surface of the upper coating layer of the belt, aimed at receiving the articles to be conveyed, can constitute an undesired obstacle, and consequently a limitation to the use of the belt, first of all in case of presence of fittings for defining the receiving seats for the above mentioned articles.

SUMMARY OF THE INVENTION

The object of the present invention is to propose a joint for toothed belt aimed at conveying articles, which is able to avoid the above mentioned drawbacks of the prior art.

More precisely, the main object of the present invention is to propose a joint which allows the toothed belt to be closed directly on the corresponding pulleys of the automatic machines by a simple and rapid operation, which considerably reduce the machine downtimes and which do not need disassembling of machine elements and covers.

Another object of the present invention is to propose a joint for toothed belt, which ensures a high reliability for any working condition and which provides the belt with suitable flexibility and strength with respect to any pulling stress.

The above mentioned objects are obtained, in accordance with the contents of the claims, by a joint for toothed belt for conveying articles, said belt including:
an inner central layer defining a belt body;
an upper layer, defining a surface for receiving articles to be conveyed; and
a lower layer featuring teeth;
said joint including:
first connecting means, attached in an irremovable way to said central layer in the area of the terminal section of a belt first edge to be joined;
second connecting means, attached irremovably to the central layer in the area of the terminal section of a belt second edge to be joined;
said first edge and sand second edge being designed to be set close to each other to complete a closed loop formed by said belt, with said first connecting means and second connecting means meshing with each other and reciprocally locked in a removable way by locking means, acting crosswise to said belt in an area of said central layer, so as to join said first edge and second edge.

According to the invention, a toothed belt is claimed, which includes:
an inner central layer defining a belt body;
an upper layer, defining a surface for receiving articles to be conveyed; and
a lower layer featuring teeth;
the said toothed belt being formed in a closed loop by a joint including:
first connecting means, attached in an irremovable way to said central layer in the area of the terminal section of a belt first edge to be joined;
second connecting means, attached irremovably to the central layer in the area of the terminal section of a belt second edge to be joined;

said first edge and sand second edge being designed to be set close to each other to complete a closed loop formed by said belt, with said first connecting means and second connecting means meshing with each other and reciprocally locked in a removable way by locking means, acting crosswise to said belt in an area of said central layer, so as to join said first edge and second edge.

BRIEF DESCRIPTION OF THE DRAWINGS

The characteristic features of the present invention are pointed out in the following description of a preferred embodiment of a joint for toothed belt aimed at conveying articles, illustrated as an example with reference to the enclosed drawings, in which:

FIG. 1 is a schematic top view, partially fragmented, of the joint proposed by the present invention, in a configuration, in which the two edges of the toothed belt to be joined are close to each other, while

DESCRIPTION OF THE PREFERRED EMBODIMENTS

With reference to the enclosed drawings, reference G indicates a toothed belt for special applications, such as synchronized conveying of articles being handles or processed by automatic machine (not shown).

The two edges of the belt, a first edge L1 and a second edge L2, are to be joined by a joint 100 proposed by the present invention, so as to close the belt G to become endless.

This type of belt G usually includes an inner central support layer C, defining the belt body, an upper layer S, defining the surface for receiving articles to be conveyed, and a lower layer D. The lower layer features teeth which meshes with the teeth of pulley provided in a line of an automatic machine.

The inner central support layer C can be formed e.g. only by elastic polyurethane material, if the belt must be elastic.

Otherwise, the inner central support layer C can include a plurality of parallel strands, e.g. made of steel or kevlar, dipped, during molding, in a polymeric material, like e.g. polyurethane, if the belt must be resistant to pull stresses.

The upper layer S is made of a special coating material, fulfilling the required specific working needs and can include fittings T (one of which is shown as an example in FIG. 3), defining successive seats for the articles to be conveyed.

The above mentioned joint 100 proposed by the present invention includes first connecting means 1, attached removably to the central layer C in the area of the terminal section of the belt first edge L1 to be joined, and second connecting means 2, attached irremovably to the central layer C in the area of the terminal section of the belt second edge L2 to be joined.

Figure 2:
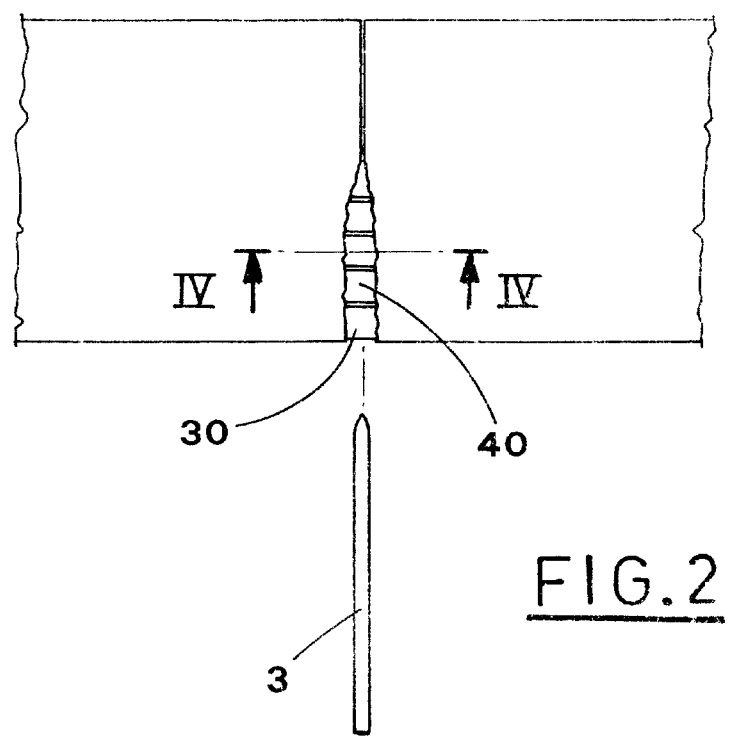
FIG. 2 is a schematic top view, partially fragmented, of the joint proposed by the present invention, in a configuration, in which the two edges of the toothed belt are joined.
Figure 4:
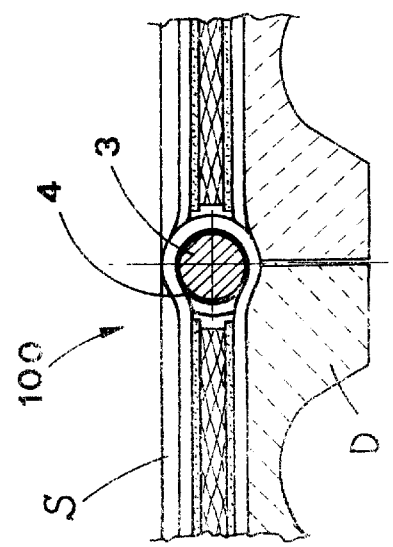
FIG. 4 is a schematic view, in a cross-section taken along IV—IV of FIG. 2.

After the first edge L1 has been moved close to the second edge L2 (configuration shown in FIG. 2 and in FIG. 4) to complete a closed loop formed by the belt G, the first connecting means 1 and the second connecting means 2 mesh with each other and are reciprocally locked, in a removable way, by locking means 3, acting crosswise to the belt G in the area of the central layer C. The first edge L1 and the second edge L2 are thus joined.

Figure 1:
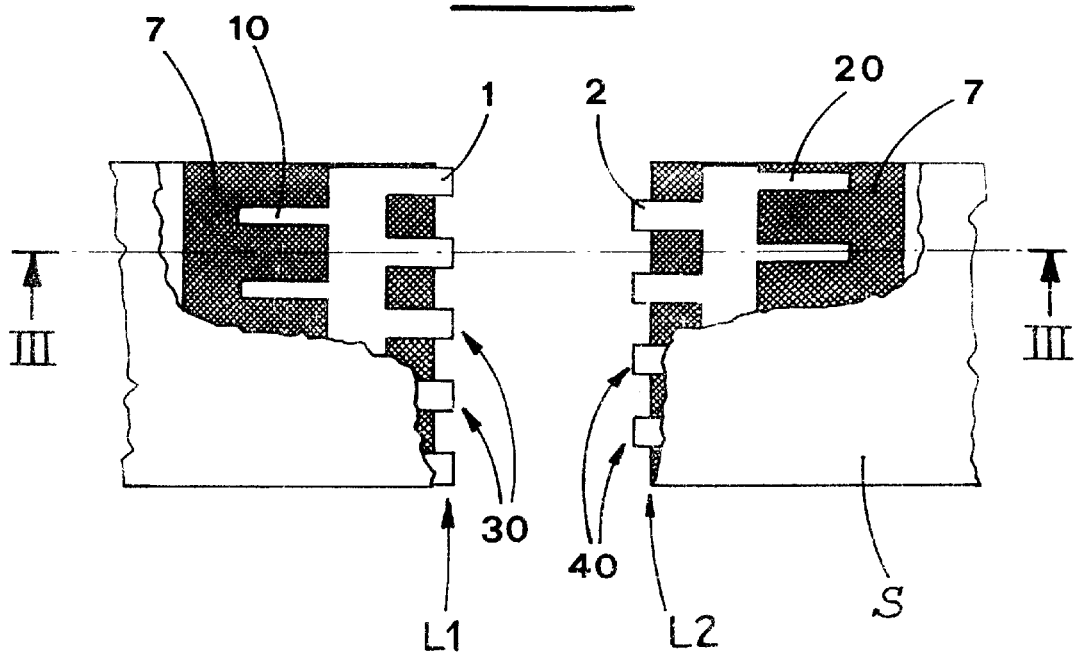
Figure 3:
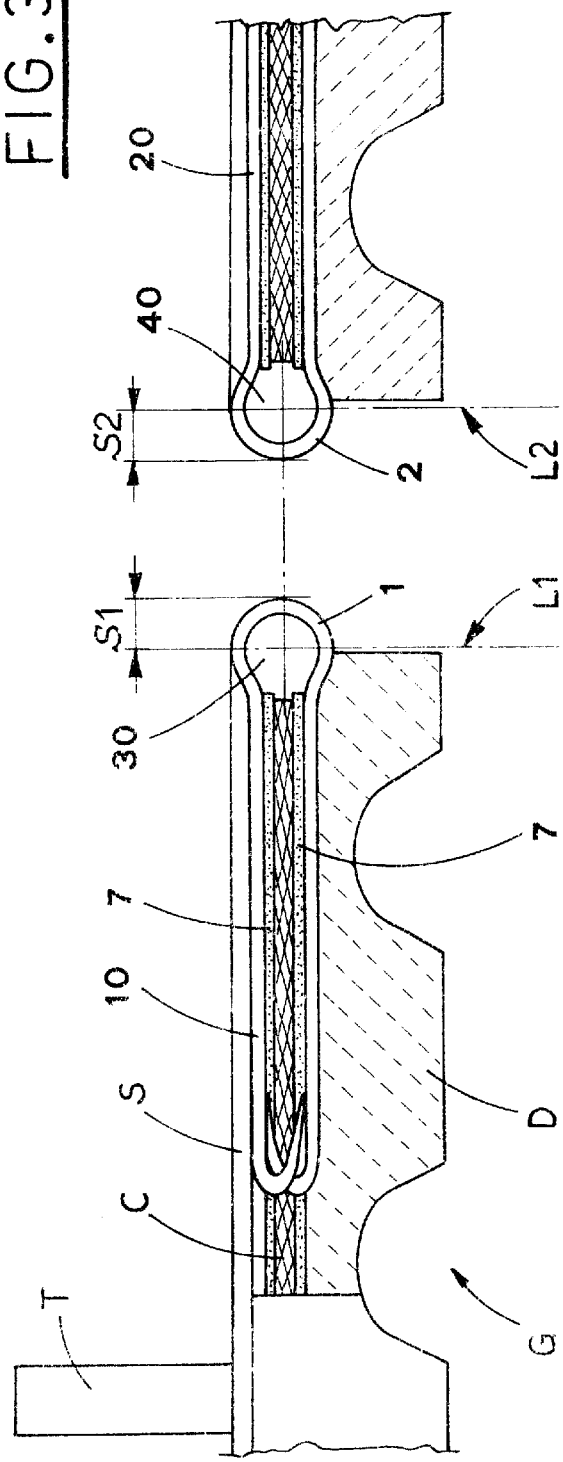
FIG. 3 is a schematic view, in a cross-section taken along III—III of FIG. 1.

More in detail, as shown for instance in FIGS. 1 and 3, the first connecting means 1 include a plurality of first slots 30, which are regularly spaced apart and protrude partially, by a same distance S1, from the terminal section of the first edge L1, while the second connecting means 2 include a plurality of second slots 40, all of them protruding from the terminal section of the second edge L2 by a same distance S2.

The second slots 40 are regularly spaced apart and suitably offset with respect to the first slots 30.

When the two edges, first edge L1 and second edge L2, are close to each other (FIG. 2 and FIG. 4), the first slots 30 and the second slots 40 are arranged one beside another and joined together, to define a channel 4 for receiving, in a removable coupling, said locking means 3, formed e.g. by a pin.

For this purpose, the distance S1 relevant to the first slots 30 and the distance S2 relevant to the second slots 40 are suitably dimensioned, e.g. of the same value S1=S2, so that the joint 100, when in configuration of mutual engagement to connect the two edges, first L1 and second L2, is wholly contained in the belt G (FIG. 4), between the upper coating layer S and the lower toothed layer D.

Each of the first connection means 1 and the second connection means 2 are suitably equipped with respective hooking means 10, 20, which act in the area of both the surfaces of the inner central layer C, in order to assure their reciprocal irremovable coupling.

The hooking means 10, 20 can include relative hooks, which engage into the central layer C, as for instance shown in FIG. 3.

The proposed joint 100 can include suitable gripping means 7, connected to both surfaces of the inner central layer C, near the first edge L1 and the second edge L2.

The hooks of the hooking means 10, 20 pass through the gripping means 7 in order to strengthen their irremovable fastening to the central layer C.

The gripping means 7 can include at least one layer of an appropriate strengthening fabric, e.g. woven metallic fabric, connected to both surfaces of the central layer C near the first edge L1 and the second edge L2.

The first connecting means 1 and the second connecting means 2 of the joint proposed by the present invention can be connected to the corresponding edges, thus defining, after having been coupled, any cross-section of the belt: e.g. in the proposed figures, they are shown connected to relative edges, which define a tooth symmetry cross plane, after having been connected.

When the toothed belt equipped with the joint proposed by the present invention is to be used, it is enough to move close the two edges, first L1 and second L2, to close the loop formed by the belt and couple the first connecting means 1 with the second connecting means 2, and in particular, to arrange the first slots 30 and the second slots 40, being joined together, one beside another, to define the channel 4, and finally to introduce the pin 3 into the channel 4 in order to lock mutually the first slots 30 with the second slots 40, and consequently to join the first edge L1 with the second edge L2.

If it is necessary to substitute the chain, it is enough to remove the pin, from the channel 4 and to move far from each other, separating them, the two edges, thus making the belt free.

According to a possible different embodiment, not shown in the enclosed drawings, in case the toothed belt has the central layer provided with parallel strands, the above mentioned first connection means 1 and the second connecting means 2 can be arranged near the belt edges L1 and L2 to be joined, directly integral with the terminal section of the strands, to define the slots.

In this case, the strands of one edge, staggered with respect to the opposite strands of the other edge, form slots in their terminal section.

The slots, after having been moved close to each other due to the joining of the two edges, define the channel receiving the locking means.

The proposed joint 100, as described above in the way of example with reference to the described drawings, is advantageously wholly contained within the plane defined by the belt, thus it does not form any kind of obstacle to receiving the articles nor to possible mounting of fittings.

Further, the joint proposed by the present invention acts substantially as a hinge completely inside the belt, consequently it does not change in any way the belt flexibility and at the same time, it assures suitable resistance to the pull stresses, to which the belt can be subjected during its use.

It is obvious, how the proposed joint allows, in a extremely rapid way, the belt assembling directly on the corresponding automatic machine, as well as its removal in case of substitution, thus reducing considerably the machine downtimes.

The above mentioned advantages are obtained by a technical solution, which is extremely functional and reliable in any operation conditions.

It is understood that what above, has been described as a pure, not limiting example, therefore, possible constructive variants of the invention remain within the protective scope of the present technical solution, as described above and claimed hereinafter.

What is claimed is:

1. A joint for toothed belt for conveying articles, said belt including:
    an inner central layer defining a belt body;
    an upper layer, defining a surface for receiving articles to be conveyed; and
    a lower layer featuring teeth;
said joint including:
    first connecting means, attached in an irremovable way to said central layer in the area of the terminal section of a belt first edge to be joined;
    second connecting means, attached irremovably to the central layer in the area of the terminal section of a belt second edge to be joined;
    said first edge and said second edge being designed to be set close to each other to complete a closed loop formed by said belt, with said first connecting means and second connecting means meshing with each other and reciprocally locked in a removable way by locking means, acting crosswise to said belt in an area of said central layer, so as to join said first edge and second edge.

2. A joint, according to claim 1, wherein said first connecting means and second connecting means are set in mutual meshing configuration to define a channel passing through said central layer and aimed at receiving said locking means, to join said first edge and second edge.

3. A joint, according to claim 2, wherein said first connecting means include a plurality of first slots, which are regularly spaced apart and protrude partially from the terminal section of said first edge, while said second connecting means include a plurality of second slots, which are regularly spaced apart and protrude partially from the terminal section of said second edge, said second slots being offset with respect to said first slots, said first slots and second slots being set in a mutual meshing configuration one beside another to define said channel.

4. A joint, according to claim 3, wherein said each of first connecting means and of second connecting means include respective hooking means acting in an area of said inner central layer, near said first edge and second edge for irremovable coupling of said first connecting means and second connecting means to said central layer.

5. A joint, according to claim 4, wherein said hooking means include a plurality of hooks engaging into said central layer.

6. A joint, according to claim 4, further including gripping means connected to both surfaces of said inner central layer, near said first edge and second edge, and set in adherence with and crossed by said hooking means to improve fastening of said hooking means to said central layer.

7. A joint, according to claim 6, wherein said gripping means include at least one layer of appropriate strengthening fabric, connected to both surfaces of the central layer.

8. A joint, according to claim 7, wherein said strengthening fabric has a weft structure.

9. A joint, according to claim 3, wherein said first slots and said second slots are integral with the terminal section of respective strands present in said central layer, near said edges, first edge and second edge, to be joined.

10. A joint, according to claim 1, wherein said locking means include a pin, introduced removably into a channel formed by said first connecting means and second connecting means.

11. A toothed belt for conveying articles, the belt including:
    an inner central layer defining a belt body;
    an upper layer, defining a surface for receiving articles to be conveyed; and
    a lower layer featuring teeth;
the said toothed belt being formed in a closed loop by a joint including:
    first connecting means, attached in an irremovable way to said central layer in the area of the terminal section of a belt first edge to be joined;
    second connecting means, attached irremovably to the central layer in the area of the terminal section of a belt second edge to be joined;
    said first edge and sand second edge being designed to be set close to each other to complete a closed loop formed by said belt, with said first connecting means and second connecting means meshing with each other and reciprocally locked in a removable way by locking means, acting crosswise to said belt in an area of said central layer, so as to join said first edge and second edge.

12. A toothed belt, according to claim 11, wherein said first connecting means and second connecting means are set in mutual meshing configuration to define a channel passing through said central layer and aimed at receiving said locking means, to join said first edge and second edge.

13. A toothed belt, according to claim 12, wherein said first connecting means include a plurality of first slots, which are regularly spaced apart and protrude partially from the terminal section of said first edge, while said second connecting means include a plurality of second slots, which are regularly spaced apart and protrude partially from the terminal section of said second edge, said second slots being offset with respect to said first slots, said first slots and second slots being set in a mutual meshing configuration one beside another to define said channel.

14. A toothed belt, according to claim 13, wherein said each of first connecting means and of second connecting means include respectively a plurality of hooks for engaging an area of said inner central layer, near said first edge and second edge for irremovable coupling of said first connecting means and second connecting means to said central layer.

15. A toothed belt, according to claim 14, further including gripping means connected to both surfaces of said inner central layer, near said first edge and second edge, and set in adherence with, and crossed by, said hooks to improve fastening of said hooks to said central layer.

16. A toothed belt, according to claim 15, wherein said gripping means include at least one layer of appropriate strengthening fabric, connected to both surfaces of the central layer.

17. A toothed belt, according to claim 13, wherein said first slots and said second slots are integral with the terminal section of respective strands present in said central layer, near said edges, first edge and second edge, to be joined.

18. A toothed belt, according to claim 13, wherein said locking means include a pin, introduced removably into a channel formed by said slots of said first connecting means and second connecting means.

* * * * *